United States Patent [19]
Lu

[11] Patent Number: 5,749,124
[45] Date of Patent: May 12, 1998

[54] HINGE FOR NOTEBOOK COMPUTER

[76] Inventor: Sheng-nan Lu, No. 174, Chunying St., Shulin Chen, Taipei Hsien, Taiwan

[21] Appl. No.: 770,242
[22] Filed: Dec. 20, 1996
[51] Int. Cl.⁶ .............................. E05F 1/08; E05C 17/64
[52] U.S. Cl. ........................... 16/307; 16/295; 16/342
[58] Field of Search ........................... 16/285, 295, 307, 16/321, 342, 319, 377

[56] References Cited

U.S. PATENT DOCUMENTS

| 340,790 | 4/1886 | Kochsmeier | 16/295 |
| 384,102 | 6/1888 | Warner | 16/295 |
| 5,197,704 | 3/1993 | Kitamura | 16/342 |
| 5,354,028 | 10/1994 | Kitamura | 16/342 |
| 5,467,504 | 11/1995 | Yang | 16/342 |
| 5,503,491 | 4/1996 | Lu | 16/342 |

Primary Examiner—Chuck Mah
Attorney, Agent, or Firm—Holland & Hart LLP

[57] ABSTRACT

This invention relates to a hinge which needs only small force to be turned in one rotational direction and relatively larger force to be turned in the opposite direction. The hinge comprises a pair of hinge members each having a cylindrical end and a fixing portion, the fixing portion having at least one aperture defined therein. An intermediate member is disposed between and pivotally connected to the pair of hinge members, the intermediate member having opposite cylindrical ends respectively aligned with and adjacent to the cylindrical ends of the pair of hinge members. A pair of helical springs with leads extending in directions opposite to each other are retained around and have different magnitudes of retaining forces acting upon corresponding adjacent ends of the intermediate member and the pair of hinge members.

8 Claims, 4 Drawing Sheets

HINGE FOR NOTEBOOK COMPUTER

THE FIELD OF THE INVENTION

This invention relates to a hinge for a notebook computer and, more particularly, to a hinge having two different types of springs mounted therein, such that while the hinge is being rotated in either of two directions two respectively different forces are thus required.

BACKGROUND OF THE INVENTION

Various hinges have been developed for notebook computers. Such hinges are disclosed, such as in the present applicant's Taiwan Patents Nos. 79,205,466, 81,201,482, 81,201,486 and 81,201,626. It is noted that most of the earlier patents awarded to the present applicant focus on the research of friction of the positioning pivot, which retains the display in a desired angle.

Because different notebook computers have different displays whose weights are thus varied, notebook computer manufacturers, therefore, need to produce various positioning pivots to match the displays.

One of the hinges that is adjustable in its friction is disclosed in Taiwan patent No. 098,526 of the present applicant. Yet there still remains the shortcoming of such a hinge which are: having constant friction in either rotational directions, it take efforts to open up the computer if a damping torque due to the friction is set for a gentle movement (i.e. without acceleration out of the weight of the display) in folding up of the computer. Alternatively, the display bumps against the chassis of the computer as it is being folded up if the torque is insufficient, though the computer may be easily opened.

SUMMARY OF THE INVENTION

It is thereof an object of the present invention to provide a hinge which needs only small force to be turned in one rotational direction and relatively larger force to be turned in the opposite direction.

To achieve the above object of the present invention, there is provided a hinge for notebook computer. The hinge comprises a pair of hinge members each having a cylindrical end and a fixing portion having apertures defined therein. An intermediate member having opposite cylindrical ends respectively aligned with and adjacent to the cylindrical ends of the pair of hinge members is disposed between and pivotally connected to the pair of hinge members. A pair of helical springs having leads extending in directions opposite to each other and having different magnitudes of initial retaining forces acting upon corresponding of the intermediate member and the pair of hinge members are retained around the adjacent ends corresponding to them. Whereby the hinge is provided with a damping torque which is smaller in a given rotational direction and larger in the opposite direction, by means of the initial retaining force.

Other objects of this invention will be more apparent from the descriptions which follow.

DETAILED DESCRIPTION OF THE PREFERRED EMBODIMENT

Figure 1:
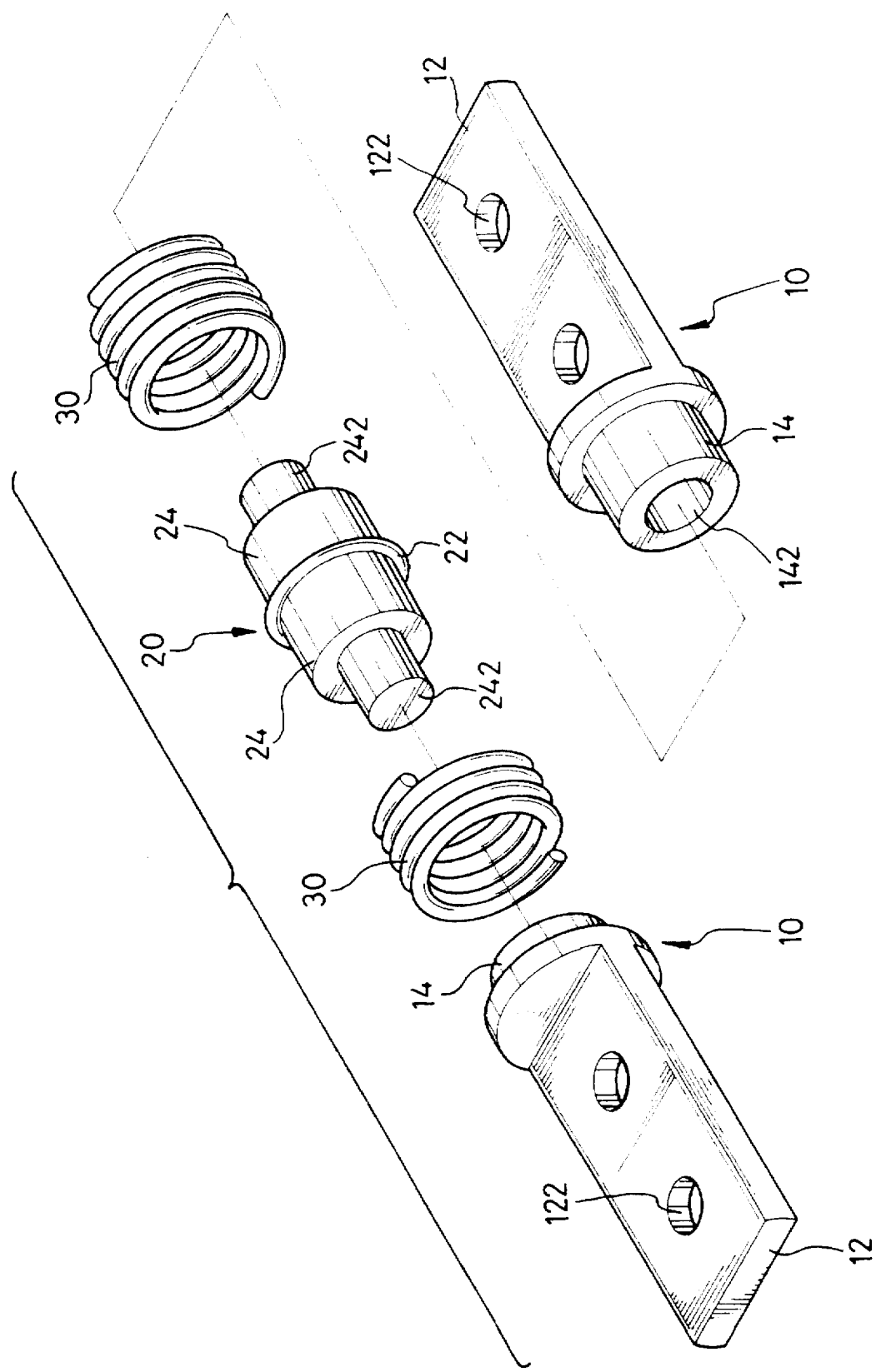
FIG. 1 is an exploded view of a hinge constructed according to a first embodiment of the present invention.

A hinge illustrated in FIG. 1 comprises an intermediate member 20 which is disposed between and pivotally connected to a pair of hinge members 10. Each of the hinge members 10 includes a fixing portion 12 having at least one aperture 122 for fastening the hinge member 10 to a respective fixture, such as, a display or alternatively a chassis of a notebook computer, and a cylindrical end 14.

A flange 22 projects from an outer circumference of a cylindrical body of the intermediate member 20, and divides the body into two opposite cylindrical ends 24. These ends 24, having a same diameter as the ends 14 of the hinge members 10, are respectively aligned with and adjacent to the respective cylindrical ends 14 of the pair of hinge members 10, so as to allow a pair of helical springs 30 to be retained around the adjacent cylindrical ends 14, 24 respectively.

The helical springs 30 have leads extending in directions opposite to each other, and originally have inner diameters smaller than outer diameters of the cylindrical ends 14 and 24 so that when such springs 30 are engaged onto the adjacent cylindrical ends 14 and 24, they tightly retained to a suitable extend around such adjacent ends 14 and 24. In other words, the springs 30 exert suitable initial pressure, namely, retaining forces radially upon peripheries of the ends 14 and 24. However, the initial retaining forces related to the two springs 30 are predetermined to be different from each other in magnitudes for the purpose which will be described below.

It is notable that in the hinge shown in FIG. 1, pivotal connection between the intermediate member 20 and each of the pair of hinge members 10 is realized by means of a blind hole 142 defined in the cylindrical end 14 of the hinge member 10 coaxially therewith. Each cylindrical end 24 has an end face from which a pair of bosses 242 respectively extend. Each boss 22 extends through a respective one of the helical springs 30 to be received in a respective blind hole 142, as best shown in FIG. 2.

Figure 2:
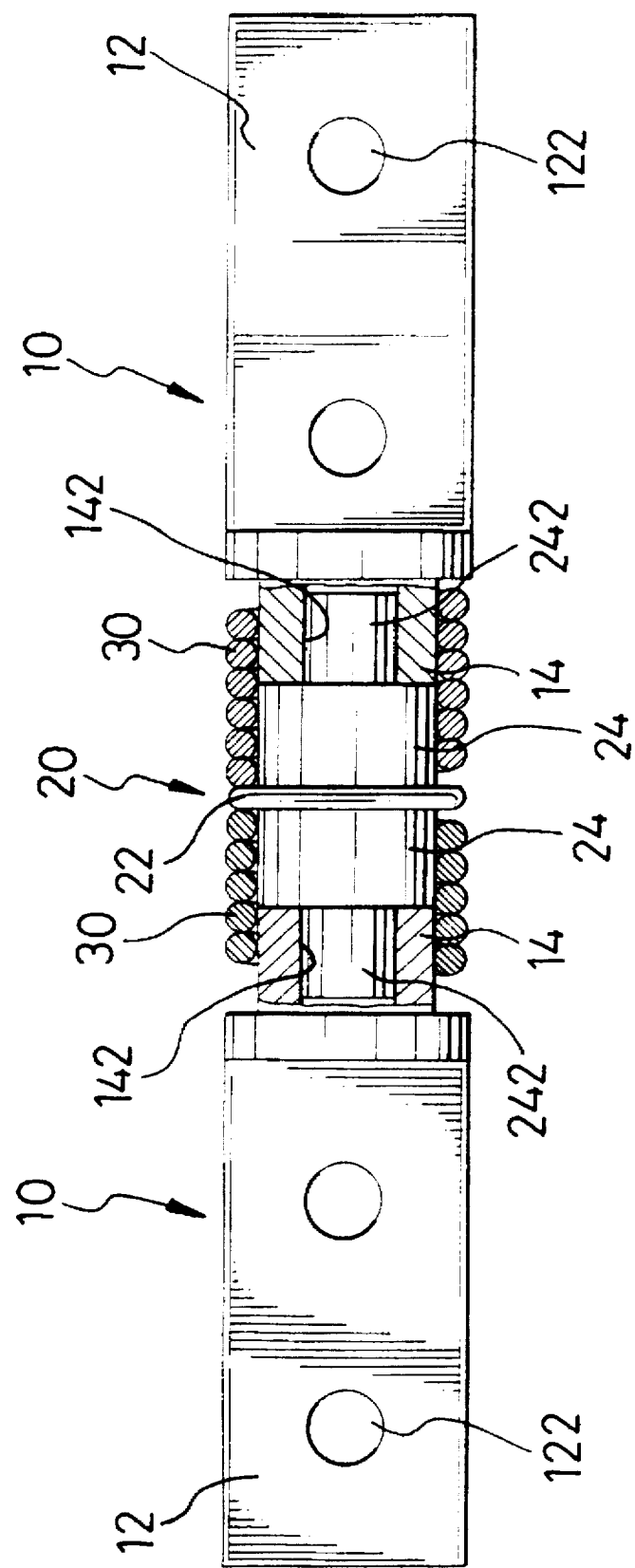
FIG. 2 is a partial cross-sectional view of the hinge shown in FIG. 1.

Still referring to FIGS. 1 and 2, if one of the hinge members 10, for example, the one at the left hand side in the FIGS. 1 and 2, is turned with respect to the other one, such as, in a counterclockwise direction, the helical spring 30 at the left side then tends to be smaller in diameter and is much more tightly retained around the ends 14 and 24 at left side corresponding to it, whereas the helical spring 30 at right side tends to be larger in diameter and is less tightly retained around the ends 14 and 24 at right side, because a friction between the respective helical spring 30 and the ends 14 and 24 corresponding to it twists the respective spring 30 in a direction either same as or opposite to the direction in which the lead of the particular helical spring 30 extends. In other words, at this time, the spring 30 at the left side exerts a much larger retaining force upon the intermediate member 20 than the spring 30 at the right side does, ignoring the difference between the two initial retaining forces. This causes the intermediate member 20 to be fixed to the hinge member 10 at the left side and rotatable with respect to the one 10 at the right side. In this case, it is the helical spring 30 at the right side that provides the damping torque, in the form of such friction which is somewhat related to it initial retaining force.

Inversely, if the hinge member 10 at the left hand side is turned with respect to the other hinge member 10 in a clockwise direction, then the helical spring 30 at the left side is less tightly retained and the helical spring 30 at the right side is much more tightly retained. Accordingly, the intermediate member 20 is fixed to the hinge member 10 at right and rotatable with respect to the one 10 at left. In this direction, it is the helical spring 30 at the right side that provides the damping torque during the rotational movement of the hinge.

As mentioned above, the damping torque during the motion is somewhat relates to the initial retaining forces which are different from each other, therefore, it is possible to provide the hinge with a damping torque having a value which is smaller when one of the hinge members 10 is turned in a given direction relative to the other hinge member 10 and which is larger when the one of the hinge members 10 is turned in the opposite direction. Although the pair of helical springs 30 are constructed the same except for the pitch of the lead thereof here, it should be appreciated that the helical springs 30 are not restricted to those as used in this embodiment, other pairs of helical springs, such as those which are made of wires having different diameters from each other, or dimensioned differently from each other in overall diameter, may also be employed.

Figure 3:
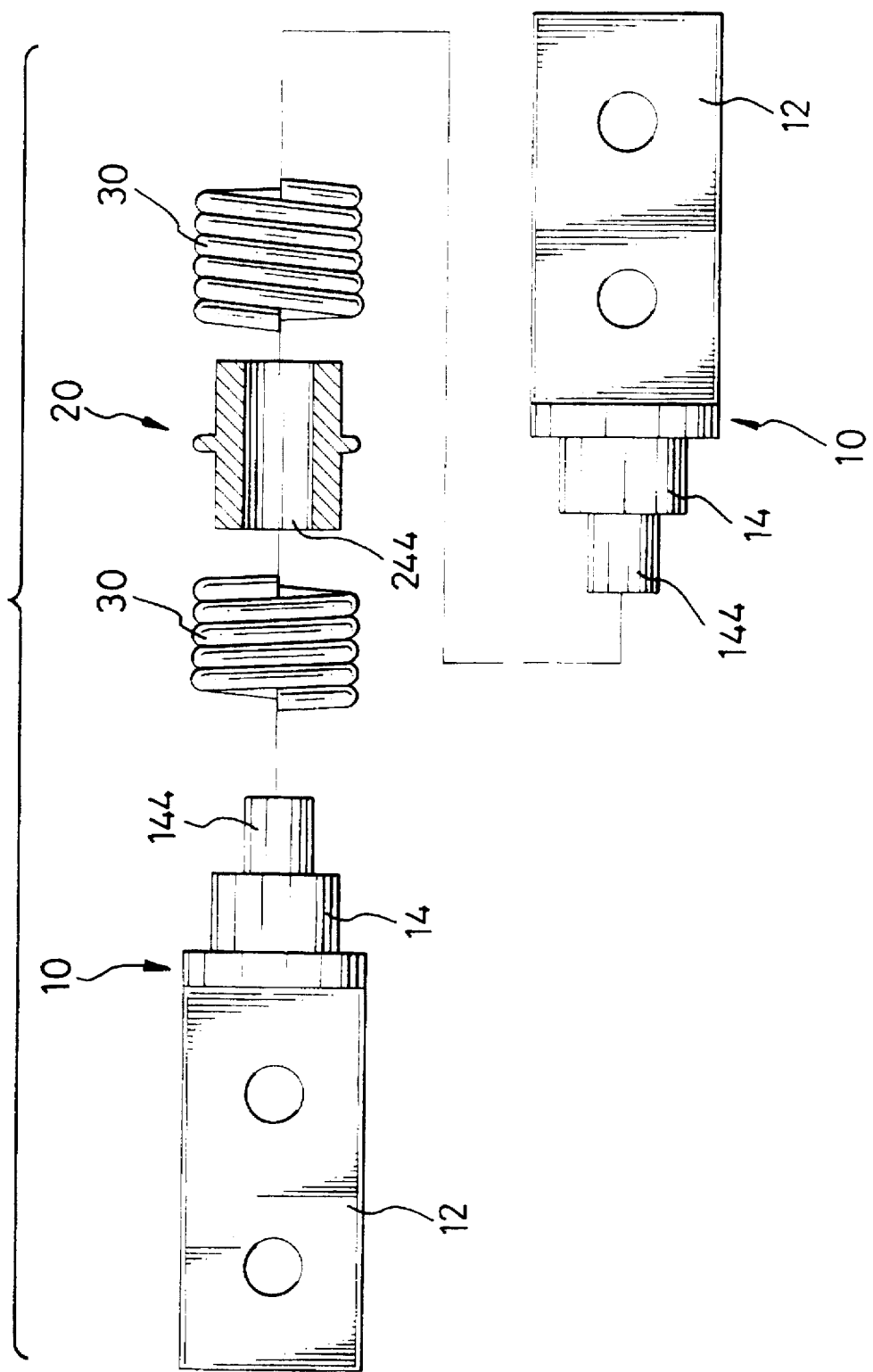
FIG. 3 is an exploded view of another hinge constructed according to a second embodiment of the present invention.

FIG. 3 is an exploded view of another hinge according to the second embodiment of the present invention. The hinge illustrated in this figure is substantially the same as the one in FIG. 1 and 2, except that in the hinge here, a boss 144 extends outward from the cylindrical ends 14 of each of the fixing members 10 instead from the end 24 of the intermediate member 20, and a hole 244 extends through cylindrical ends 244 of the intermediate member 20 coaxially therewith, so as to receive the boss 144 of the fixing member 10.

Figure 4:
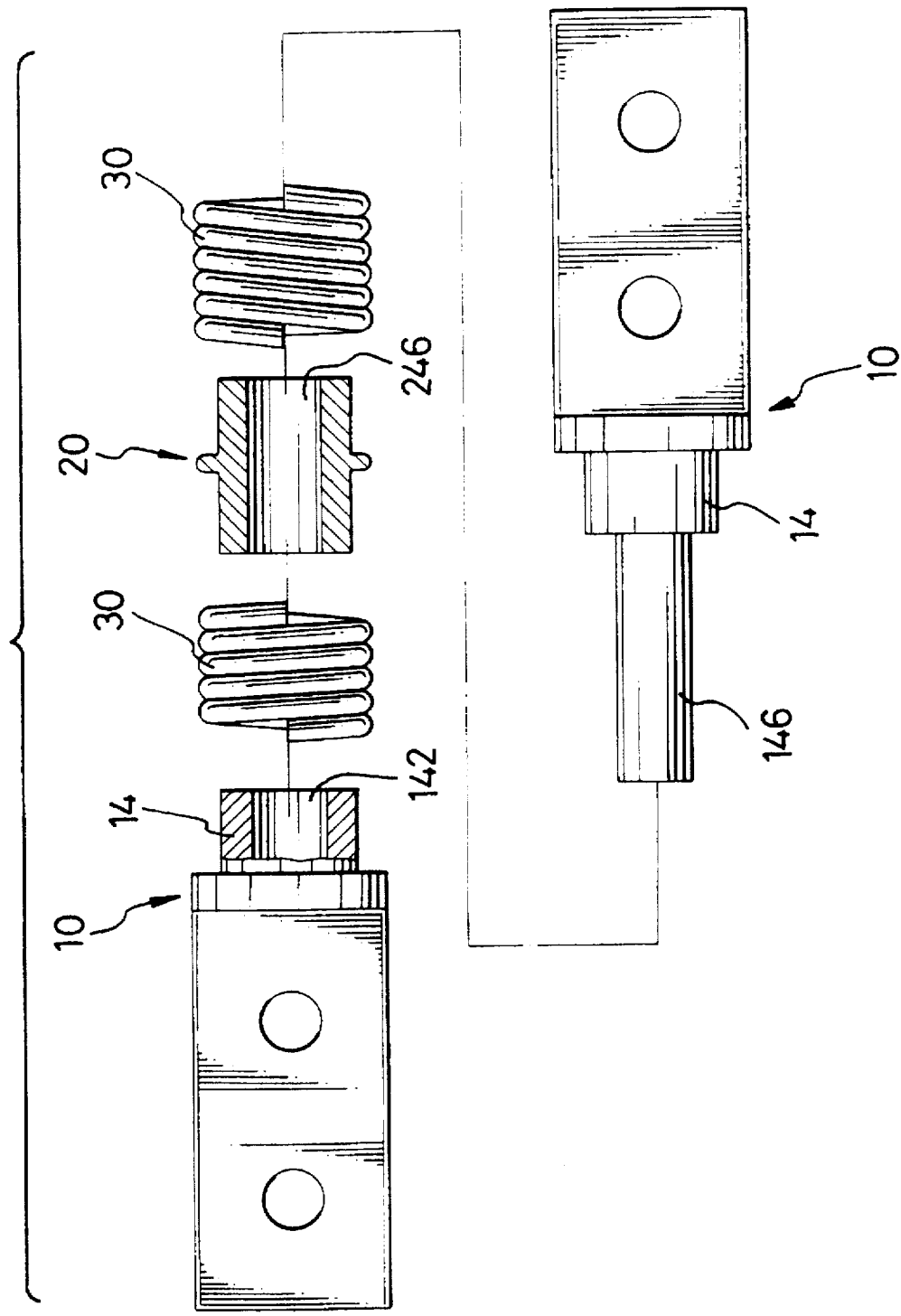
FIG. 4 is an exploded view of still another hinge constructed according to a third embodiment of the present invention.

FIG. 4 is an exploded view of still another hinge according to the third embodiment of the present invention. In the hinge of this embodiment, an elongated boss 146 extends from a cylindrical end 14 of one of the pair of hinge members 10, so as to extend through a throughhole 246 defined in the intermediate member 20 coaxially therewith, and into a hole 142 defined in the cylindrical end 14 of the other hinge member 10 in a manner as mentioned in FIG. 1 and 2, thereby the intermediate member 20 pivotally connects to the pair of hinge members 10.

While the principles of this invention have been described in connection with its embodiment, it should be understood that many other possible modifications and variations can be made without departing from the spirit and scope of the invention as hereinafter claimed.

What is claimed is:

1. A hinge for a notebook computer, comprising:
   a pair of hinge members each having a cylindrical end and a fixing portion, said fixing portion having apertures defined therein;
   an intermediate member disposed between and pivotally connected to said pair of hinge members, said intermediate member having opposite cylindrical ends respectively aligned with and adjacent to said cylindrical ends of said pair of hinge members; and
   a pair of helical springs with leads extending in directions opposite to each other, each of said pair of helical springs retained around to grip, and thereby form a retaining force on respective corresponding adjacent ends of said intermediate member and said pair of hinge members, each of said pair of helical springs having a different magnitude of retaining force;
   whereby said hinge provides a damping torque which is smaller in a given rotational direction and larger in the opposite direction due to said differing retaining forces.

2. A hinge as claimed in claim 1 wherein a hole is defined in each of said pair of hinge members at said cylindrical end thereof to rotatably receive a respective boss extending from said cylindrical ends of said intermediate member, thereby said intermediate member pivotally connecting to said pair of hinge members.

3. A hinge as claimed in claim 1 wherein a boss extends from said cylindrical end of each of said pair of hinge members so as to be rotatably received in a hole extending through said intermediate member, thereby said intermediate member pivotally connecting to said pair of hinge members.

4. A hinge as claimed in claim 1 wherein an elongated boss extends from said cylindrical end of one of said pair of hinge members to extend through a throughhole of said intermediate member and into a hole defined in said cylindrical end of the other one of said pair of hinge members, thereby said intermediate member pivotally connecting to said pair of hinge members.

5. A hinge as claimed in claim 1 wherein said intermediate member has a flange projected from a middle part of an outer periphery thereof.

6. A hinge as claimed in claim 1 wherein said pair of helical springs are constructed with a different pitch thereof.

7. A hinge as claimed in claim 1 wherein said pair of helical springs are made of wires having diameters different from each other.

8. A hinge as claimed in claim 1 wherein said pair of helical springs are made of wires having same diameter but each of the helical springs have a different overall diameter.

* * * * *